C. S. CHRISMAN.
GAS APPARATUS VALVE OR CLOSURE MECHANISM.
APPLICATION FILED JUNE 24, 1919.
1,368,229. Patented Feb. 8, 1921.
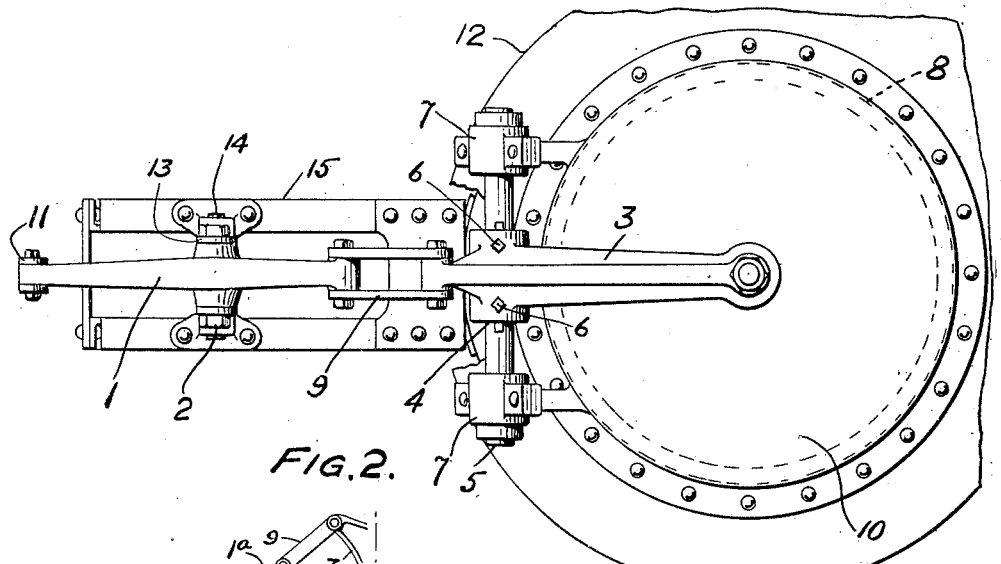
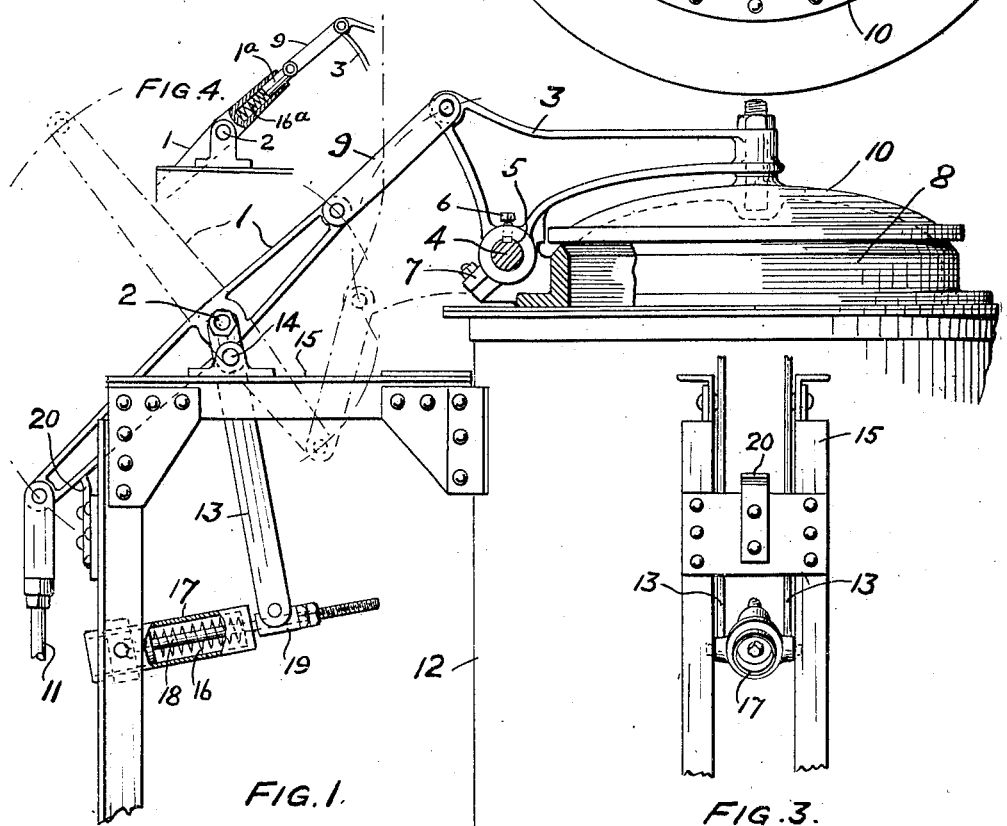
INVENTOR
Charles S. Chrisman
BY
Augustus B. Stoughton
ATTORNEY.
WITNESS:
Robt. R. Kitchel

UNITED STATES PATENT OFFICE.

CHARLES S. CHRISMAN, OF WEST CHESTER, PENNSYLVANIA, ASSIGNOR TO THE U. G. I. CONTRACTING COMPANY, OF PHILADELPHIA, PENNSYLVANIA, A CORPORATION OF DELAWARE.

GAS-APPARATUS VALVE OR CLOSURE MECHANISM.

1,368,229.     Specification of Letters Patent.     Patented Feb. 8, 1921.

Application filed June 24, 1919. Serial No. 306,505.

*To all whom it may concern:*

Be it known that I, CHARLES S. CHRISMAN, a citizen of the United States, residing at West Chester, in the county of Chester and State of Pennsylvania, have invented a certain new and useful Gas-Apparatus Valve or Closure Mechanism, of which the following is a specification.

The principal objects of the present invention are, first, to provide for holding the valve seated without reliance upon its weight so that the valve and its operating mechanism may be comparatively light and therefore inexpensive in construction and capable of quick and economical operation; second, to permit of a substantial reduction in size of any hydraulic cylinder apparatus that may be employed for operating the valve; third, to provide for permitting of the momentary release of the means which hold the valve to its seat in case of a "puff" in the vessel or chamber closed by the valve; fourth, to operate the valve by straight line pull and thrust on a radial line; and fifth, to provide a light, quick acting, comparatively inexpensive, efficient and desirable gas apparatus stack, purge or other valve or closure and operating mechanism.

Other objects as well as the invention itself will appear from the following description which will be given in connection with the accompanying drawings forming part hereof and in which—

Figure 1, is a side view, partly in section, illustrating a gas apparatus valve and operating mechanism embodying features of the invention.

Fig. 2, is a top or plan view of the same.

Fig. 3, is a side view of part of the apparatus, and

Fig. 4, is a detached sectional view illustrating a modification and drawn to a reduced scale.

In the drawings 1, is a beam pivoted or fulcrumed at 2, and it constitutes a toggle-member. 3, is a lever pivoted or fulcrumed at 4, for example, by means of a shaft 5, to which it is attached by a set screw 6, and which is journaled in bearing 7, shown as connected with the valve seat 8. A link 9, shown as consisting of two parallel plates, is pivotally connected with one end of the beam 1, and with one end of the lever 3, and this link constitutes the other toggle element.

The valve 10, is connected with the free end of the lever 3, and hand or other power is applied to the beam 1, for example, by means of the connection 11, which may be operated by hand gear or by a hydraulic piston and cylinder, not shown but well understood, and in the latter case the cylinder may be comparatively small, because of the light weight of the valve 10. When the beam 1, and link 9, constituting a toggle lever joint, approach alinement, for example, by a downward pull of the connection 11, they co-act as a toggle joint upon the lever 3, and force the valve 10, to its seat 8, so that the weight of the valve 10, is not relied upon for holding it closed. It may be remarked that the parts operate in a straight line which is advantageous in avoiding torsional strains. When the joint between the beam 1, and link 9, is bent, downward in the drawing, for example, by raising the free end of the beam by an upward thrust of the connection 11, the lever 3, raises the valve 10, from its seat 8. When it is desired to permit the valve 10, to unseat in the event of a "puff" in the chamber or vessel 12, a spring support or abutment for one of the toggle elements is provided. As shown in Fig. 1, the pivot point or fulcrum 2, of the beam 1, is carried by an arm 13, (illustrated as consisting of a pair of plates) pivoted at 14, to the framework or structural steel support 15, and acted upon by a spring 16. The spring 16, is shown as a compression spring mounted in a barrel 17, pivoted to the framework and provided with a plunger rod 18, having an adjustable block or element 19, to which one end of the arm 13, is pivoted. 20, is a stop for the members of the toggle joint. Normally the spring 16, tends to shift the pivot point 2, clockwise, in the drawing, and this in co-action with the stop 20, tends to straighten the knuckle of the toggle-joint and seat the lid 10, but a "puff" under the lid unseats it and for this purpose the spring momentarily yields and lets the pivot point 2, shift counter-clockwise, in the drawing. As shown in Fig. 4, one of the toggle elements, in that instance the beam although it might be the link, is provided with a coupling 1ª, in the nature of a plunger slidable in a tubular portion of the beam and acted upon by the compression spring 16ª, the operation being substantially as above described in the case of the spring support or abutments shown in Fig. 4.

The operation of the valve mechanism is quick and economical, because the valve is light since reliance is not had upon its weight to seat it, and for this same reason comparatively little power is required for operating the connection 11, or beam 1, and therefore where a hydraulic piston and cylinder are employed for this purpose they may be small. Due to light weight the apparatus is comparatively inexpensive to install and operate, and the apparatus is durable, for the spring support, when present, in some appropriate form, takes up wear on the joints, and because it operates in a straight line.

It will be obvious to those skilled in the art that modifications may be made in details of construction and arrangement without departing from the spirit of the invention and therefore my invention is not limited in respect to such matters or otherwise than the prior art and the appended claims may require.

I claim:

1. A gas apparatus valve mechanism comprising in combination a beam constituting a toggle-member, a spring pressed rocker arm about which the beam oscillates as a center, a fulcrumed lever, a valve attached to the lever, and a link pivotally connecting the lever and beam and constituting with the latter a toggle joint, substantially as described.

2. A gas apparatus valve mechanism comprising in combination a beam and a lever fulcrumed intermediate of their lengths, a link connecting one of the ends of each, a valve connected to the free end of said lever, operating mechanism connected to the free end of the beam, a rocker arm to which the beam is pivoted, and a spring coöperating with the arm, substantially as described.

3. A gas apparatus valve mechanism comprising in combination a pivotal beam, a link pivoted to the beam and constituting therewith a toggle-lever joint, a spring support for the toggle lever joint, a pivotal lever connected with the link, and a valve connected to the free end of the lever, substantially as described.

CHARLES S. CHRISMAN.